Jan. 10, 1950  J. M. LAIHO  2,494,181
ELECTRICAL CIRCUIT CONTROLLER
Filed Feb. 23, 1945  3 Sheets-Sheet 1
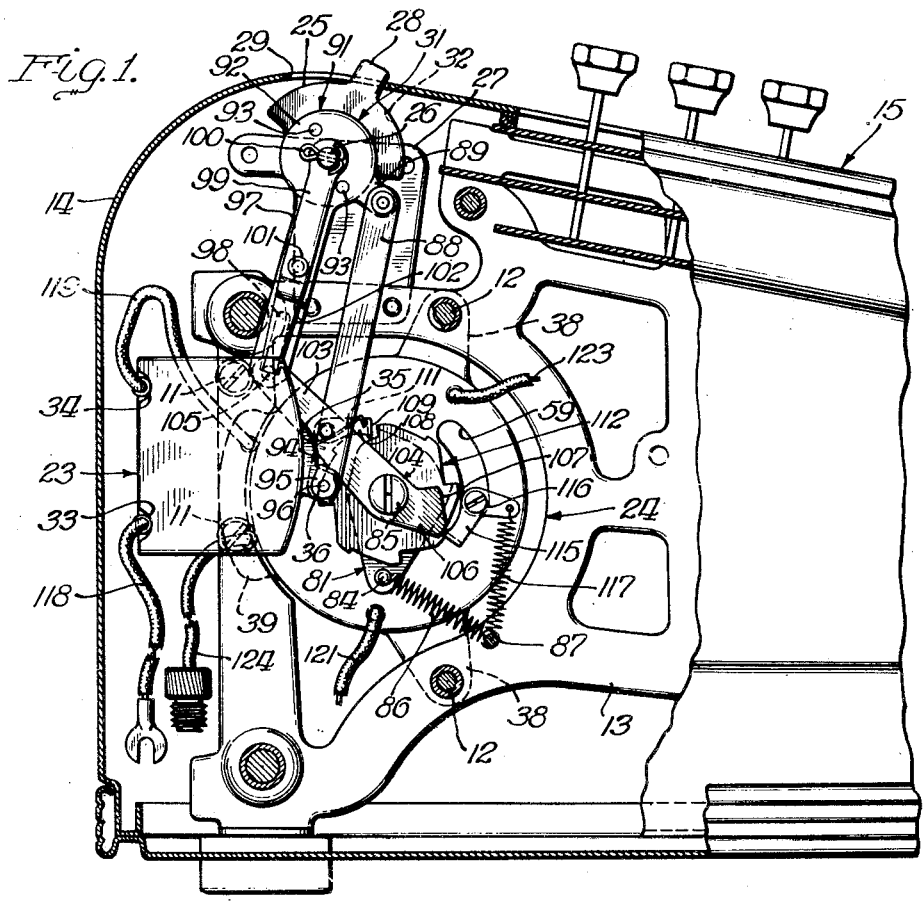
INVENTOR.
Jalmer M. Laiho
BY
Sheridan, Davis & Cargill
Attys.

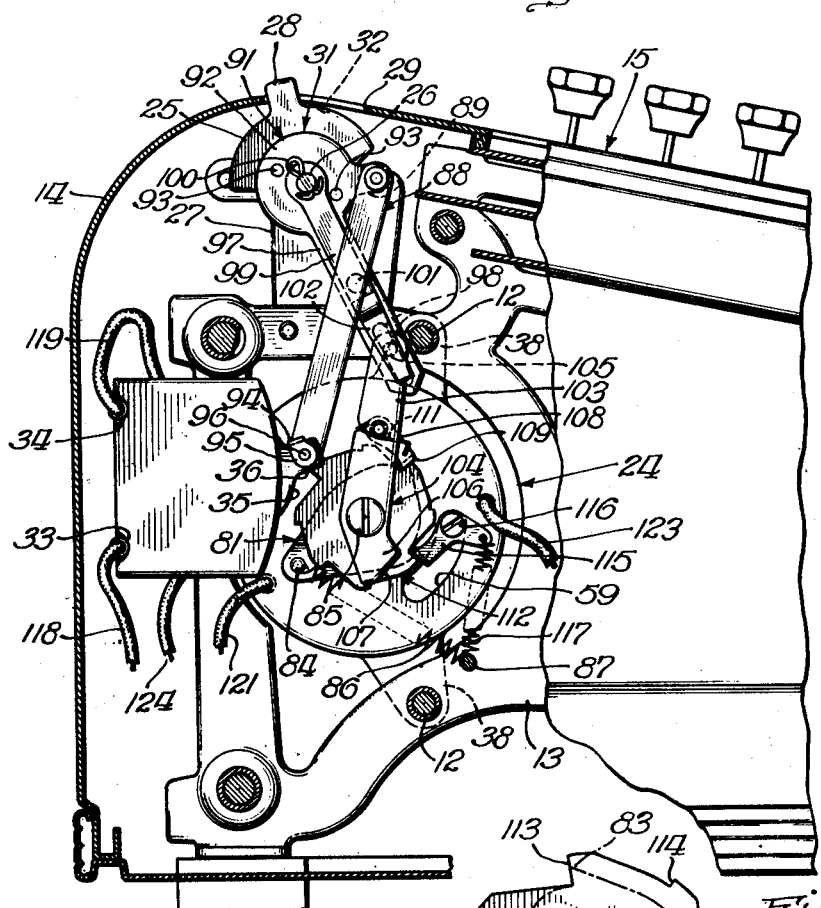

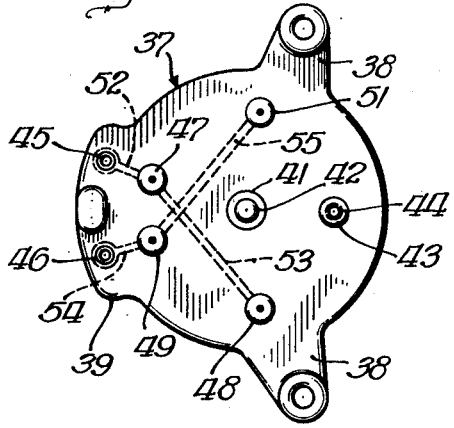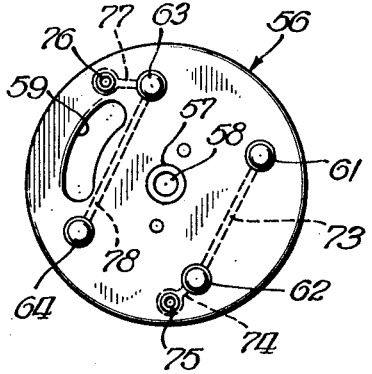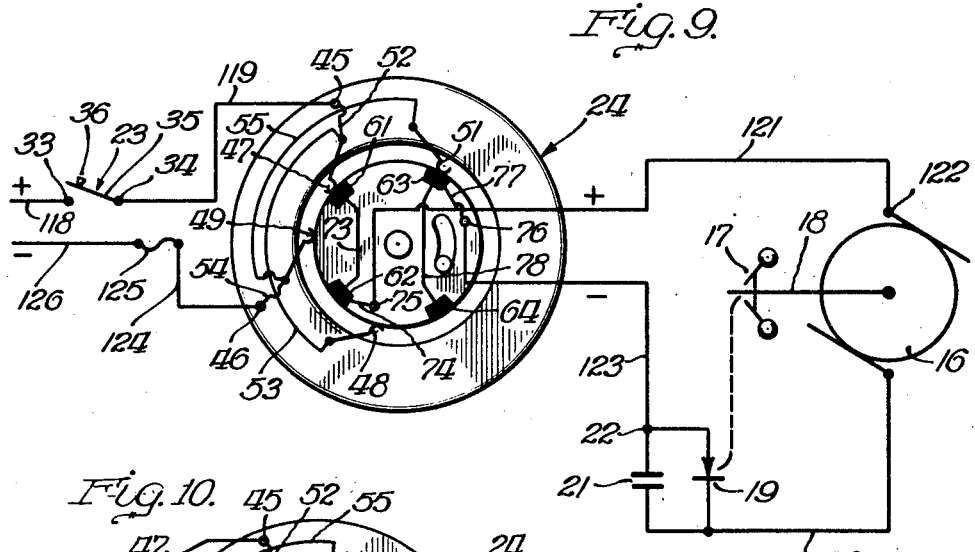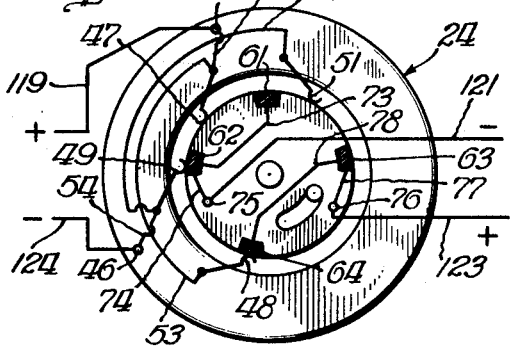

Patented Jan. 10, 1950

2,494,181

UNITED STATES PATENT OFFICE 2,494,181

ELECTRICAL CIRCUIT CONTROLLER

Jalmer M. Laiho, Skokie, Ill., assignor to Felt & Tarrant Manufacturing Company, Chicago, Ill., a corporation of Illinois Application February 23, 1945, Serial No. 579,446

9 Claims. (Cl. 200—5)

This invention relates to electrical circuit controllers and has more particular reference to such a controller for opening and closing direct current electrical circuits and changing the polarity thereof.

An object of the invention is the provision of a novel and an improved electrical circuit controller for such circuits which include make-and-break contacts that frequently more or less rapidly interrupt the circuit.

Another object of the invention is the provision of a polarity changer for such circuits which is adapted in operation to change the electrical polarity of such make-and-break contacts sufficiently often to minimize the pitting or sputtering effects of circuit interruptions on the make-and-break contacts in the controlled circuit.

A further object of the invention is the provision of such a controller which is operable not only to turn an electrical circuit on and off, i. e., to close and open the circuit, but also, when so operated, determines the polarity of the controlled circuit and during each subsequent operation changes the polarity thereof.

Another object of the invention is the provision in such a controller of a novel operating mechanism common to a circuit control switch and a polarity changer and adapted to operate them concurrently.

A further object of the invention is the provision of such a circuit controller which is simple and inexpensive in structure, positive and reliable in operation, and wherein the polarity of the controlled circuit is changeable as an incident of closing or opening that circuit a predetermined number of times.

Numerous other objects and advantages of the invention will be apparent as it is better understood from the following description, which, when taken in connection with the accompanying drawings, discloses a preferred embodiment thereof.

In the drawings:

Fig. 1 is an elevation of an electrical circuit controller in the off or circuit opened position embodying the features of the invention and is shown mounted in a machine which is illustrative of devices employing circuits in which the novel controller may be used to advantage;

Fig. 2 is an end elevation of the novel polarity changer employed in the controller shown in Fig. 1;

Fig. 3 is a side elevation partially in cross-section of the polarity changer of Fig. 2;

Fig. 4 is a view similar to Fig. 1 with the novel electrical circuit controller in the on or circuit closed position;

Fig. 5 is a fragmentary cross-section through the movable member of the polarity changer taken at one of its contact members, the corresponding portion of the stationary member of the polarity changer being shown in broken lines, and shows the details of the contact construction;

Fig. 6 is a plan view of a ratchet employed to control the polarity changes relative to a predetermined number of control switch operations, the operating ratchet of the polarity changer being shown in broken lines in the same relationship to the polarity control ratchet as that illustrated in Fig. 1;

Figs. 7 and 8 are end elevations of the stationary member and the movable member of the polarity changer, respectively, and show the arrangements and relationships of their contacts;

Fig. 9 is a schematic wiring diagram of the motor circuit employed in the machine of Fig. 1 with the novel circuit controller connected to the circuit and shown in the off-position, and Fig. 10 is a schematic wiring diagram of a portion of the circuit of Fig. 9 and shows the polarity changer in the position of Fig. 4 wherein it has reversed the polarity of the motor circuit.

For the purpose of illustrating a use of the invention, the novel circuit controller, as shown in Figs. 1 and 4, is suitably supported as by bolts 11 and 12 on a frame member 13 in a casing 14 of a power-driven calculating machine 15 like that disclosed in U. S. Letters Patent No. 2,018,933, issued October 29, 1935, and No. 2,063,962, issued December 15, 1936. Such a machine per se constitutes no part of the present invention but is merely illustrative of a device including an electrical circuit wherein make-and-break contacts more or less rapidly interrupt the circuit in the use of the machine. The illustrated machine will not therefore be described in detail herein, but it might be well to point out by way of explanation that such machines are sometimes powered by a direct current electrical motor 16 having a governor 17 on the motor shaft as diagrammatically indicated at 18 in Fig. 9. The governor 17 functions to open and close normally closed, make-and-break contacts 19 in series with the motor for controlling the speed thereof. When the motor speed exceeds a predetermined value, the contacts 19 are opened by the governor, thereby interrupting the motor circuit, and thereafter are closed to close the circuit when, as a result of the opening of the contacts 19, the motor speed decreases to that predetermined value, all as fully described in U. S. Letters Patent No. 2,088,004, issued July 27, 1937.

One terminal of the motor 16 is electrically connected by a conductor 20 to a common terminal of the make-and-break contacts 19 and a suitable condenser 21 electrically shunting or in parallel with the contacts 19 between that common terminal and another common terminal 22. The condenser is intended to inhibit or at least to reduce arcing between the make-and-break contacts 19 during the operation thereof as just described. Despite the use of the condenser 21, sputtering of metal occurs between the make-and-break contacts and results in pitting, the transfer of contact metal from one to the other of the contacts, or a combination of those results. Thus the useful life of such contacts is reduced, and they become inefficient electrical conductors. It has heretofore been suggested that a polarity changer be employed in such circuits for from time-to-time reversing the polarity thereof, and hence the direction of sputtering between the make-and-break contacts to reduce the deleterious effects mentioned above and to improve the useful life of the contacts. Such polarity changers have, however, been of relatively complex and more expensive structure and are sometimes subject to mis-operation and other operating defects.

To overcome such disadvantages and to contribute to the attainment of the objects of the invention, the novel circuit controller comprises, as shown in Figs. 1 and 4, a circuit closing and opening or an on-and-off switch 23 secured to the frame member 13 by the bolts 11, a polarity changer 24 secured to the frame member by the bolts 12, an operating member 25 which is pivoted by a pin 26 to the end of an upstanding plate or bracket 27 riveted or otherwise secured to the frame member 13 and which is provided with a handle or other projection 28 extending through an appropriately located opening 29 in the casing 14, and connections indicated by the general reference numeral 31 between the operating member 25 and both the switch 23 and the polarity changer 24. Thus the operating member 25 and its handle 28 are common to the switch 23 and the polarity changer 24 and are movable between the positions of Figs. 1 and 4 to operate them. If desired, the operating member is provided with suitable indicating means 32 which is concealed by the casing 14 when the operating member is in the circuit opened or "off" position of Fig. 1 and is visible through the opening 29 when the operating member is in the circuit closed or "on" position of Fig. 4.

In the illustrated circuit controller the switch 23 is shown as being a usual toggle or snap-over switch of the single-pole, single-throw type. The switch is enclosed in a suitable switch casing and is provided with a pair of terminals 33 and 34 extending outside the switch casing, preferably at one side thereof, and with a switch operating member 35 extending outside of the switch casing and having a handle or other projection 36 at the side of the switch casing opposite the terminals 33 and 34. Terminals 33 and 34, it will be understood, adapt the switch for electrical connection in or to a circuit to be controlled thereby and the switch is operable by moving the operating member 35 between the off or circuit opened position of Fig. 1, where the handle 36 is shown as inclining downwardly to the right, and the on or circuit closed position of Fig. 4, where the handle 36 is shown as inclining upwardly to the right.

The polarity changer 24 included in the novel circuit controller is itself of novel construction and is, as shown in Figs. 1 and 4, mounted on the frame member 13 adjacent the switch 23. The details of the polarity changer are shown best in Figs. 7 and 8. It comprises as therein illustrated a two-part casing which not only serves to mount and encase certain parts of the polarity changer, but also cooperates with those parts in effecting changes in polarity. The casing is preferably made of "Bakelite" or other suitable insulating material.

One of the casing parts is a stationary member or stator 37. As shown in Figs. 3 and 7 it is of generally cylindrical form having spaced mounting projections 38 extending outwardly from its periphery with apertures therein to accommodate the mounting screws 12, and an arcuate terminal bearing portion or strip 39 projecting from its periphery between the projections 38.

Embedded in the stator at its center is a metal bushing 41 having an axial aperture 42 which is preferably internally threaded to facilitate assembling the two-part casing. At the side of the bushing 41 opposite the terminal strip 39 and spaced radially outwardly from the bushing, a stud or post 43 has one end embedded in an end face of the stator and extends outwardly therefrom in a direction normal to the end face of the stator. At its outer end the stud 43 is provided with an axial, internally threaded recess 44 (Fig. 7). The terminal strip 39 has embedded therein a pair of hollow metal tubes 45 and 46 adapted to serve as electrical terminals for the polarity changer to facilitate connecting it in or to a circuit to be controlled by the novel circuit controller.

Four electrical contact members 47, 48, 49, and 51 at a common radius are spaced about the metal bushing and are so constructed and embedded in the stator as to have a preferably round end portion of each contact member exposed at or slightly outwardly of the end face of the stator from which the stud 43 projects. The contact member 47 is radially inwardly of the terminal 45 to which it is electrically connected by a conductor 52 embedded in the stator between its end faces and is electrically connected to the contact member 48 by a conductor 53 likewise embedded in the stator. The contact members 47 and 48 being at opposite sides of and unequally spaced from the contact member 49. The contact members 49 and 51 are similarly arranged with respect to the contact member 47 and the terminal 46, and the contact member 49 is electrically connected to the terminal 46 by an embedded conductor 54 and to the contact member 51 by an embedded conductor 55.

The other casing part is a movable or rotatable member or rotor 56. As shown in Figs. 3 and 8, it is of cylindrical form of about the same diameter as the stator. Embedded in the rotor at its center is a metal bushing 57 having an axial aperture 58 therethrough. At a radius from the center of the rotor equal to the distance from the center of the stator to the stud 43, an arcuate aperture 59 is formed or otherwise provided in the rotor. That aperture is adapted to receive therethrough the stud 43 of the stator and to cooperate with that stud for permitting and limiting relative movement of the stator and rotor when in assembled relationship.

At the same radius from the center of the rotor as the contact members 47, 48, 49, and 51 are from the center of the stator, the rotor is provided with four electrical contacts 61, 62, 63, and 64 in spaced relationship about the metal bushing 57. Those contacts are identical and the details of one of them are shown in Fig. 5. As therein illustrated each such contact comprises a metal socket member 65 and a spring urged contact member 66 slidably arranged therein. Each socket member 65 is embedded in the rotor and is provided with an outer end flush with an end face of the rotor and with an axial recess 67 open at the outer end of the socket member and communicating at its inner end with a smaller coaxial recess or depression 68 in the inner closed end of the socket member.

In each of the socket members 65 there is one of the spring urged contact members 66. Each such contact member 66 is provided with a contact head 69 slidably arranged in the open end of the socket recess 67, an integral stem 71 extending from the contact head 69 inwardly of the socket recess 67 and into the smaller co-axial recess 68 wherein the stem is slidable, and a spring 72 coiled about the stem 71 and bearing at one end against the closed end of the socket member and at its other end against the contact head 69. The rotor contacts 61, 62, 63, and 64 are arranged to cooperate with the stator contacts 47, 49, 51, and 48 respectively during operation of the rotor for determining the polarity of the controlled circuit.

For that purpose the contacts 61 and 62 are positioned at the side of the bushing 57 opposite the arcuate aperture 59 and are electrically connected together by a conductor 73 embedded in the rotor between its end faces and extending between the socket members 65 of those contacts. Another conductor 74 likewise embedded in the rotor extends between the socket member 65 of the contact 62 and a hollow metal tube 75 embedded in the rotor and adapted to serve as an electrical terminal thereof for electrically connecting the terminal 75 to the contact 62. A similar metal tube or electrical terminal 76 is embedded in the rotor adjacent one end of the arcuate aperture 59 and is electrically connected by a conductor 77 to the socket member 65 of the contact 63. That contact 63 is electrically connected to the contact 64 by a conductor 78 extending between the socket members 65 of those two contacts, the conductors 77 and 78, like the conductors 73 and 74, being embedded in the rotor. Secured to the end face of the rotor 56 opposite that bearing the contacts, by pins or other suitable securing means 79, is a rotor operating member stamped or otherwise provided in the form of a two-tooth ratchet 81 having an aperture 82 receivable on the outwardly projecting end of the metal bushing 57, a pair of spaced ratchet teeth 83 at one side of the aperture, and a laterally extending pin 84 at the other side of the aperture.

With the contacts 61, 62, 63, and 64 assembled in the rotor, and the contact bearing end faces of the rotor and stator arranged in opposed relationship, the aperture 42 in the central stator bushing 41 is axially aligned with the aperture 58 in the central rotor bushing 57 and the stud 43 of the stator is aligned with the arcuate aperture 59 in the rotor. When so arranged, the stator and rotor are brought together with the stud 43 extending through the arcuate aperture 59 as seen in Figs. 2, and 3. A shouldered screw 85 is then inserted in the aperture 58 of the rotor bushing 57 and threaded into the aligned aperture 42 of the stator bushing 41 to hold the stator and rotor is assembled relationship. The thus assembled polarity changer is then secured by the bolts 12 and the mounting projections 38 of the stator to the frame 13 as already described.

When so assembled and mounted, the rotor is yieldably held in the position of Fig. 1 relative to the stator by a suitable spring 86 secured at one end to the laterally extending pin 84 of the two-tooth ratchet 81 and at its other end to an appropriately located pin 87 anchored in the frame member 13. In that position of Fig. 1 the lower end of the arcuate aperture 59 in the rotor is in engagement with the stud 43 of the stator. The rotor contacts 61 and 63 are in engagement with the stator contacts 47 and 51 respectively. Thus, the stator terminal 45 is electrically connected to the rotor terminal 75 by the conductor 52, the stator contact 47, the rotor contact 61, the conductor 73, and the conductor 74 and the stator terminal 46 is electrically connected to the rotor terminal 76 by the conductor 54, the stator contact 49, the conductor 55, the stator contact 51, the rotor contact 63, and the conductor 77.

By rotating the ratchet 81 in a clockwise direction as viewed in Fig. 1 to the position of Fig. 4 the rotor is rotated against the action of the spring 86 and relative to the stator until the upper end of the arcuate aperture 59 in the rotor engages the stud 43 of the stator. In that position of Fig. 4, the rotor contacts 62 and 64 are in engagement with the stator contacts 49 and 48, respectively. Thus the stator terminal 45 is electrically connected to the rotor terminal 76 by the conductor 52, the stator contact 47, the conductor 53, the stator contact 48, the rotor contact 64, the conductor 78, the rotor contact 63, and the conductor 77, and the stator terminal 46 is electrically connected to the rotor terminal 75 by the conductor 54, the stator contact 49, the rotor contact 62, and the conductor 74.

In the first mentioned position, that illustrated in Figs. 1 and 9, the stator terminal 45 is connected to the rotor terminal 75. Those two terminals are therefore of the same polarity. In the second position, that illustrated in Figs. 4 and 10, on the other hand, that stator terminal 45 is connected to the rotor terminal 76. Hence in such position the stator terminal 45 and the rotor terminal 76 are of the same polarity. Likewise, in the first position, the stator terminal 46 is connected to the rotor terminal 76 and is of the same polarity, while in the second position that stator terminal 46 is connected to the rotor terminal 75 and is of the same polarity. Thus the polarities of the rotor terminals 75 and 76 are reversed when the rotor is moved from the position illustrated in Figs. 1 and 9 to that shown in Figs. 4 and 10.

As already suggested the member 25 is a common operating member for the on and off switch 23 and the polarity changer 24 and the connections 31 transmit the movement of that common operating member to the switch operating member 35 and the operating member or ratchet 81 of the polarity changer to turn the switch on and off (Fig. 1) and concurrently with succeeding operations of the switch so to arrange the rotor contacts 61, 62, 63, and 64 relative to the stator contact members 47, 49, 51, and 48 respectively as to connect the rotor terminals 76 and 75 to the stator terminals 45 and 46 respectively and the rotor terminals 75 and 76 to the stator terminals 45 and 46 respectively after a predetermined number of operations of the operating member 25. For so operating the switch 23, the handle 36 of its operating member 35 is pivotally connected to one end of a link 88 extending upwardly from the handle 36 and having its other end pivotally connected to a crank arm or projection 89 of a lever 91. That lever 91 has a disc hub 92 pivoted on the pin 26 and secured as by pins 93 to the operating member 25. Where desired, a bearing strap 94 is saddled on the handle 36 with depending ends 95 adjacent opposite sides of the handle, and a suitable pivot pin or rivet 96 is inserted through the depending ends 95, the intermediate handle 36 and the lower end of the link 88 to strengthen the pivotal connection between the switch handle 36 and the link 88.

In addition to the crank arm 89, the lever 91 is stamped or otherwise provided with a depending arm 97 having an elongated aperture 98 extending longitudinally of the depending lever arm at its lower end. Pivoted on the pin 26 adjacent to and with the lever 91 is a metal lever 99 depending from the pin along and adjacent the lever arm 97, secured thereto and pivotable intermediate its ends as by a headed stud 101, and therebelow having an offset end portion 102 spaced from the apertured lower end of the lever arm 97. The space between the lever arm 97 and the end portion 102 of the lever 99 is such that a pin carrying arm 103 of a lever 104 can be held between the arm 97 and the end portion 102 with its pin 105 extending into the elongated aperture 98 of the arm 97 to provide a slidable pivotal connection between the levers 91 and 104. In effecting such a connection the cotter pin 100 is removed from the pin 26 to permit the operating member 25 to be moved along the pin 26 toward the left of the machine, or forwardly, as shown in Figs. 1 and 4, a distance such that the forward surface of the lever 91 of member 25 is even with the end of the pin 26 and the upper end of lever 99 no longer engages the pin. The lever 99 can now be pivoted on its stud 101 an amount sufficient to swing its offset end portion 102 out of proximity with the aperture 98. There is sufficient resiliency of the member 25 on the pin 26 and of the arm 103 of the lever 104 on the shouldered screw 85 that when the member 25 is in its normal position on the pin 26, the pin 105 of the arm 103 can be engaged in the aperture 98. The member 25 can again be shifted on the pin 26 to enable the lever 99 to be pivoted so that its lower offset end portion 102 retains the arm 103 to keep the pin 105 in engagement in the aperture 98 to permit slidable movement of the pin in the aperture. The member 25 can now be moved to its normal position on the pin 26 and the cotter pin 100 inserted.

The lever 104 is pivotally mounted on the shouldered screw 85 employed in the assembly of the polarity changer 24 outwardly of the operating member or ratchet 81 thereof. That lever 104 is stamped or otherwise provided with an arm 106 having a cam surface 107 at the side of the screw 85 opposite the pin carrying arm 103. In addition to the pin 105 and between it and the shouldered screw 85, the lever arm 103 has suitably pivoted thereto a pawl 108 having a laterally extending portion 109 which is urged by a spring 111 toward engageable relationship with the teeth 83 of the operating ratchet 81 of the polarity changer 24. Thus the connections 31 include the link 88 and the arm 89 between the operating member 25 and the switch 23, and the lever 104, the pawl 108, the pin 105, and the arm 97 between the operating member 25 and the polarity changer 24. As already stated, those connections are adapted to transmit the movements of the common operating member 25 between the positions of Figs. 1 and 4 to operate the switch and polarity changer for controlling the period of operation of the motor 18 and the polarity of its speed controlling make-and-break contacts 19 for each such period of operation.

Rotatable on the shouldered screw 85 between the operating ratchet 81 of the polarity changer and the lever 104, there is provided a double ratchet 112 for controlling the operation of the polarity changer whereby to adapt the novel circuit controller for changing the polarity of the controlled circuit upon a predetermined number of operations of the on-and-off switch 23. That double ratchet 112 is stamped or otherwise provided with two sets of teeth 113 and 114 which are spaced about its periphery at an outside radius which, as shown in Fig. 6, is greater than the distance between the center of rotation of the ratchet 81 and the outer tips of its teeth 83, that distance hereinafter being called the outside radius of the ratchet teeth 83. The teeth 113 are spaced apart a distance equal to the spacing between the teeth 83 of the operating ratchet 81, and where it is desired to change the polarity for each succeeding operating period of the motor or other circuit controlled by the novel circuit controller, the ratchet 112 is provided with a tooth 114 midway between each such tooth 113 and the next succeeding tooth 113. The outside radius of the teeth 113 and 114 and the root radius of the teeth 114 are greater than the outside radius of the teeth 83 on the operating ratchet 81. The root radius of the teeth 113 is equal to the root radius of the teeth 83.

Both sets of the ratchet teeth 113 and 114 of the ratchet 112 are engageable by the laterally extending portion 109 of the pawl 108 for rotating the ratchet step-by-step in a clockwise direction as viewed in Fig. 1. With the described relationship of the teeth 83, 113, and 114, however, the ratchet 112 when any one of its teeth 113 is in engageable position permits the pawl 108 also to engage one of the teeth 83 of the ratch 81 and, when any one of its teeth 114 is in engageable position, prevents the pawl 108 from engaging any of the teeth 83 of the ratchet 81. Thus the ratchet 112 controls the operation of the operating ratchet 81 and hence controls the operation of the polarity changer for determining the polarity of the controlled circuit.

For releasably latching the ratchets 81 and 112 whenever they are rotated in a clockwise direction from their positions of Fig. 1 by the pawl 108 and for loading the ratchet 112 to prevent accidental counterclockwise displacement from the position of Fig. 1, a pawl 115 is pivoted on a shouldered screw 116 threaded into the recess 44 in the outer end of the stud 43 outwardly of the rotor 56. That pawl 115 is urged toward engagement with the ratchets 81 and 112 by a suitable spring 117 secured at one end to the pawl 115 and at its opposite end to the pin 87 in the frame member 13. Fig. 4 shows the pawl 115 releasably latching both ratchets 81 and 112 in a displaced position as described. The pawl 115 is operable by the cam surface 107 of the lever arm 106 to release the ratchet 81 as the common operating member 25 is moved by its handle 28 from its Fig. 4 position to its Fig. 1 position. When that occurs after such displacement of the ratchet 81, the spring 86 returns that ratchet and hence the rotor 56 to the position shown in Fig. 1.

The novel circuit controller is arranged to control the circuit of the motor 16 by connecting the switch terminal 33 to a suitable source (not shown) of electrical energy, say the positive (+) side thereof as shown in Fig. 9 by a conductor 118. The other switch terminal 34 is connected by a conductor 119 to the stator terminal 45 of the polarity changer 24. The rotor terminal 75 of the polarity changer is connected by a conductor 121 to one terminal 122 of the motor 16. The other terminal of the motor 16 as already described is connected to one common terminal of the parallel connected contacts 19 and condenser 21 by the conductor 20. The other common terminal 22 and the terminal 122 are circuit terminals for the motor 16. The terminal 22 is connected by a conductor 123 to the rotor terminal 76 of the polarity changer. The circuit is completed by a conductor 124 connecting the stator terminal 46 to one side of a suitable fuse 125, the other side of which is connected to the side 126 of the energy supply source of opposite polarity to the side 118 thereof as indicated by the negative (−) symbol in Fig. 9.

In considering the operation of the novel circuit controller, let it be assumed that the conductors 118 and 126 are connected to the positive (+) and negative (−) sides, respectively, of the energy supply source, as indicated in Fig. 9; the common operating member 25 is in the position of Fig. 1, hence the switch 23 is open as shown in Fig. 9; and the ratchets 81 and 112 are in the position of Fig. 1 wherein each of the teeth 83 of the former and succeeding teeth 113 of the latter are in aligned relationship and the teeth of one pair of those aligned teeth 83 and 113 are engageable by the laterally extending portion 109 of the pawl 108, and wherein the pawl 115 engages one of the teeth 114 of the ratchet 112. By moving the handle 28 from that position of Fig. 1 to that of Fig. 4, the common operating member 25 and the lever 91 secured thereto are rotated about the pivot pin 26 in a counterclockwise direction as viewed in Fig. 1.

Such rotation of the lever 91 is transmitted as an upward pull through the lever arm 89 and link 88 to the handle 36 and is sufficient to move the handle 36 upwardly enough to move the operating member 35 of the switch 23 to its "on" or circuit closed position as shown in Fig. 4. During such rotation of the lever 91, its depending arm 97 swings in a counterclockwise direction about the pivot pin 26 and, through the connection made by the slot 98 and pin 105 slidable therein, the thus swinging lever arm 97 swings the lever 104 in a clockwise direction from its position of Fig. 1 to that of Fig. 4. The pawl 108 on the lever arm 103 of the swinging lever 104 is thus brought into engagement with the teeth of one pair of the aligned teeth 83 and 113 of the ratchets 81 and 112, respectively, and thereby rotates those ratchets clockwise, as viewed in Fig. 1, the distance between the engaged tooth 113 of the ratchet 112 and the next succeeding tooth of that ratchet, which in the illustrated embodiment of the invention is one of the teeth 114. Such rotation of the ratchets 81 and 113 moves the other pair of aligned teeth 83 and 113 beyond the pawl 115 for engagement thereby whereby releasably to hold the ratchet 81 against return movement in a counterclockwise direction (Fig. 4) under the action of its spring 86.

The rotation of the ratchet 81 as just described from the position of Fig. 1 to that of Fig. 4 turns the rotor 56 so that the lower end of its arcuate aperture 59 moves away from and its upper end moves to engagement with the stud 43 of the stator 37. Thus operation of the common operating member 25 as just described simultaneously closes the switch 23 and rotates the rotor 56 of the polarity changer 24 a definite distance relative to the stator 37.

The described operation of the polarity changer 24 arranges its rotor 56 relative to its stator 37 in the position illustrated in Fig. 10 wherein the stator terminals 45 and 46 are electrically connected, as already described, to the rotor terminals 76 and 75, respectively. Hence, where as illustrated the stator terminals 45 and 46 have the indicated polarities, the rotor terminals 76 and 75 are positive and negative, respectively, and hence circuit terminals 22 and 122 are positive and negative, respectively.

By moving the handle 28 back to its position of Fig. 1, the common operating member 25 and the lever 91 are rotated in a clockwise direction. Such rotation of the lever 91, acting through its arm 89 and the link 88 moves the handle 36 and operating member 35 sufficiently to open the switch 23. During such rotation of the lever 91, its depending arm 97 swings in a clockwise direction about the lever pivot 26 and thus swings the lever 104 in a counterclockwise direction. The pawl 108 on the lever arm 103 of the swinging lever 104, while the pawl 115 releasably holds the ratchets 81 and 112 in the position of Fig. 4, is thus brought into position for engagement with the tooth 114 next following the tooth 113 of the ratchet 112 that the pawl engaged during the next preceding operation to turn the switch 23 on. Thereafter the cam surface 107 of the lever arm 106 engages the pawl 115 and moves it out of latching engagement with the ratchet 81.

The thus released ratchet 81 and the rotor 56 are rotated in a counterclockwise direction by the spring 86 from the position of Fig. 4, wherein the upper end of the arcuate slot 59 engages the stud 43, to the position wherein the lower end of that slot engages the stud 43, as shown in Fig. 1. Since the teeth 114 of the ratchet 112 have a root diameter greater than the outside diameter of the teeth 83 on the ratchet 81, as already described, the pawl 108 engaging one of the teeth 114 is held outwardly of the teeth 83 during such counterclockwise rotation of the ratchet 81 and rotor 56 and during the next ratchet operating movement of the pawl. Thus when the handle 28 of the common operating member 25 is next moved to its "on" position (Fig. 4), the switch 23 is closed, and the pawl 108 indexes only the ratchet 112 the distance between succeeding teeth thereof in a clockwise direction (Fig. 1), but the pawl 108 does not engage or move the ratchet 81. Hence the rotor 56 remains in the position illustrated in Figs. 1 and 9. The latter view, except for the open switch 23, shows the circuit condition as a result of such operation. While in the preceding operation, as shown in Fig. 10, the stator terminals 45 and 46 were electrically connected to the rotor terminals 76 and 75, respectively, in the succeeding operation, as shown in Fig. 9, the stator terminals 45 and 46 are electrically connected to the rotor terminals 75 and 76, respectively. In the preceding operation, while, as already described, the rotor terminals 76 and 75 were positive and negative, respectively, they are now as a result of such operation negative and positive, respectively, and therefore the polarities of the circuit terminals 22 and 122 have been reversed.

When the handle 28 of the common operating member 25 is next moved to its "off" position from the position of Fig. 4, the switch 23, polarity changer 24, connections 31, ratchet 81, and ratchet 112 are in the respective positions thereof shown in Fig. 1. The foregoing cycle comprises two complete operations of the reciprocable operating member 25 from its "off" position of Fig. 1, to its "on" position of Fig. 4 and back to the "off" position of Fig. 1. This cycle may be repeated as desired and every other or alternate time the common operating member 25 is operated to turn the switch 23 "on," that operating member cooperates with the connections 31, the ratchet 81, and the control rachet 112 to effect a reversal of the polarity of the motor circuit and hence of the make-and-break contacts 19 therein.

It is thought that the invention and its attendant advantages will be understood from the foregoing description, and it will be apparent that various changes may be made in the form, construction and arrangement of the parts without departing from the spirit and scope of the invention or sacrificing all of its material advantages, the form hereinbefore described and illustrated in the drawings being merely a preferred embodiment.

I claim:

1. An electrical circuit controller, comprising a switch having a switch operating member, a polarity changer having an operating member, operating means common to said switch and said polarity changer for operating them, said operating means including a lever having an arm operatively connected to said switch operating member, and another arm, a lever connected to said other arm for operation thereby, means on the last said lever engageable with the operating member for said polarity changer for operation thereof, and means for cyclically controlling the last said means relative to the operations of said switch.

2. An electrical circuit controller, comprising a switch having a switch operating member, a polarity changer having a pivoted operating member, operating means common to said switch and polarity changer for operating them, connecting means between said operating means and said switch operating member, a lever connected to said connecting means for operation therewith, means on said lever engageable with the pivoted operating member of said polarity changer for operation thereof, and rotatable means having alternating portions adapted alternately to prevent and to permit engagement of the last said means with said pivoted operating member for controlling the operation of said polarity changer.

3. In an electrical circuit controller, a polarity changer having an operating member mounted for limited reversing movement between two spaced positions corresponding to opposite electrical polarities, driving means engageable with said operating member in one of said spaced positions for moving it from that one to the other of said spaced positions, latching means engageable with said operating member at said other of said spaced positions for releasably holding said operating member there, means for returning said operating member, when released, from said other to the said one of said spaced positions thereof, means operable by said driving means for operating said latching means to release said operating member, and rotatable means having spaced portions adapted to prevent engagement of said operating member by said driving means and other spaced portions interspersed among the first mentioned portions and adapted to permit engagement of said operating member by said driving means, for controlling the operation of said polarity changer.

4. In an electrical circuit controller, a stationary insulating member having a set of two arcuately spaced, electrically connected contacts, another set of two arcuately spaced, electrically connected contacts, the contacts of said sets being arranged about a common center at a common radius and those of each set being at opposite sides of each contact of the other set, and two electrical terminals embedded in said stationary member at a greater radius than said common radius and respectively electrically connected to said sets of contacts, and a rotary insulating member mounted for limited rocking movement relative to said stationary member between two spaced positions about an axis passing through said common center and having a set of two arcuately spaced, electrically connected contacts, another set of two arcuately spaced, electrically connected contacts, the contacts of the last said sets being arranged about said axis at a common radius equal to the first said common radius and both contacts of each of the last said sets being at the same side of each contact of the other set, and two electrical terminals embedded in said rotary member at a greater radius than said common radius and respectively electrically connected to the last said sets of contacts, a contact of each of the first and second said sets of contacts of said rotary member in each of said spaced positions of said rotary member engaging one of the contacts of each of the first and second said sets of contacts of said stationary member, and the other contacts of the first and second said sets of contacts of said stationary member in each of such spaced positions of said rotary member being respectively arcuately spaced from the contacts of the second and first said sets of contacts of said rotary member in the direction in which said rotary member is rotatable to the other of said spaced positions and an arcuate distance equal to that separating said spaced positions.

5. In an electrical circuit controller, a stationary insulating member having two sets of two arcuately spaced, electrically connected contacts, the contacts of said sets being arranged about a common center at a common radius and with alternate contacts in the same set and adjacent contacts in different sets, and a rotary insulating member mounted for limited rocking movement between two spaced positions and about an axis passing through said common center and having two sets of two arcuately spaced, electrically connected contacts, the contacts of the last said two sets being arranged about said axis at a common radius equal to the first said common radius and with the contacts in each set adjacent and each contact adjacent a contact in a different set of contacts of said rotary member, two adjacent contacts of different sets of contacts of the rotary member in each of said spaced positions thereof respectively engaging two adjacent contacts of different sets of contacts of the stationary member and the other two adjacent contacts of the different sets of contacts of the stationary member in each of such spaced positions of said rotary member being respectively arcuately spaced from the other two adjacent contacts of the different sets of contacts of the rotary member in the direction in which said rotary member is rotatable to the other of said spaced positions and an arcuate distance equal to that separating said spaced positions.

6. In an electrical circuit controller, a polarity changer comprising a polarity changing member mounted for limited rocking movement about an axis and between two extreme positions, two pairs of stationary contacts operatively related to said member, said contacts being disposed at a common radius about said axis with alternate contacts in the same pair and electrically connected together, and two pairs of circuit making contacts mounted on said member and disposed about said axis at said common radius with the circuit making contacts of each pair adjacent and electrically connected together, two circuit making contacts of different pairs of such contacts in each such extreme position of said polarity changing member respectively engaging two stationary contacts of different pairs of such stationary contacts, and the other two circuit making contacts of the different pairs of such contacts in each such extreme position of said polarity changing member being respectively arcuately spaced from the other two stationary contacts of the different pairs of such stationary contacts in a direction opposite that in which said member is rotatable to the other extreme position and an arcuate distance equal to the spacing between said extreme positions.

7. In an electrical circuit controller, a polarity changer according to claim 6, wherein a said circuit making contact includes a socket member, a contact member slidably arranged therein, and a spring in said socket member and urging said contact member outwardly thereof.

8. In an electrical polarity reversing switch, a reversing switch member mounted for limited rocking movement about an axis between two extreme positions, two pairs of stationary contacts operatively related to said member, said contacts being disposed at a common radius about said axis with alternate contacts in the same pair and electrically connected together, one lead terminal for each of said two pairs of stationary contacts and electrically connected thereto, two pairs of circuit making contacts mounted on said reversing switch member and disposed about said axis at said common radius with the circuit making contacts of each pair adjacent and electrically connected together, one lead terminal for each of said two pairs of circuit making contacts and electrically connected thereto, two circuit making contacts of different pairs of such contacts in one such extreme position of said reversing switch member engaging two stationary contacts of different pairs of such stationary contacts thereby to connect the two lead terminals of the two pairs of circuit making contacts, and the other two circuit making contacts of different pairs of such contacts in the other such extreme position of said reversing switch member engaging the other two stationary contacts of different pairs of such stationary contacts thereby to connect the two lead terminals of the two pairs of stationary contacts to the two lead terminals of the two pairs of circuit making contacts but in the reverse order to that in which they were connected in the first extreme position of said reversing switch member.

9. In combination with an electrical circuit including a pair of make-and-break contacts, a circuit controller, comprising a switch operable to control the flow of current to said contacts, a polarity changer interposed in said circuit between said switch and said contacts and operable to reverse the flow of current to said contacts, a manually reciprocable member for closing and opening said switch, and control mechanism interposed between said reciprocable member and said polarity changer for causing said reciprocable member to cyclically operate said polarity changer after a predetermined plurality of operations of said switch thereby.

JALMER M. LAIHO.

REFERENCES CITED

The following references are of record in the file of this patent:

UNITED STATES PATENTS

| Number | Name | Date |
|---|---|---|
| 1,176,794 | Uhl | Mar. 28, 1916 |
| 2,162,237 | Avery | June 13, 1939 |